United States Patent
Cheng et al.

(10) Patent No.: US 10,904,951 B2
(45) Date of Patent: *Jan. 26, 2021

(54) VARIABLE PEAK WAVELENGTH COOKING INSTRUMENT WITH SUPPORT TRAY

(71) Applicant: Brava Home, Inc., Redwood City, CA (US)

(72) Inventors: Shih-yu Cheng, Union City, CA (US); Mark Janoff, Redwood City, CA (US); Richard Metzler, San Antonio, TX (US); Dan Yue, Palo Alto, CA (US)

(73) Assignee: BRAVA HOME, INC., Redwood City, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/005,632

(22) Filed: Jun. 11, 2018

(65) Prior Publication Data

US 2018/0295676 A1 Oct. 11, 2018

Related U.S. Application Data

(63) Continuation of application No. 15/490,768, filed on Apr. 18, 2017, now Pat. No. 10,064,244, which is a
(Continued)

(51) Int. Cl.
*H05B 3/00* (2006.01)
*F24C 15/16* (2006.01)
(Continued)

(52) U.S. Cl.
CPC ........... *H05B 3/0076* (2013.01); *F24C 7/046* (2013.01); *F24C 7/065* (2013.01); *F24C 7/085* (2013.01);
(Continued)

(58) Field of Classification Search
CPC .... H05B 3/0076; H05B 3/0071; H05B 3/742; H05B 3/744; H05B 6/6441; H05B 6/6455;
(Continued)

(56) References Cited

U.S. PATENT DOCUMENTS 3,407,285 A    10/1968   Jacobs
4,117,294 A    9/1978   Appelquist et al.
(Continued)

FOREIGN PATENT DOCUMENTS

CN           1892673        10/2007
CN         101398197        4/2009
(Continued)

*Primary Examiner* — Shawntina T Fuqua
(74) *Attorney, Agent, or Firm* — Haynes and Boone, LLP

(57) ABSTRACT

Several embodiments include a cooking appliance/instrument (e.g., oven). The cooking appliance/instrument can include a cooking chamber, a support tray adapted to hold food in the cooking chamber; and a heating system comprised of at least a heating element. The heating system is adapted to emit waves according to a particular configuration such that the emitted waves is substantially transparent or substantially opaque to the support tray and thus enabling the cooking instrument to select what to heat.

20 Claims, 9 Drawing Sheets

Related U.S. Application Data continuation-in-part of application No. 15/261,784, filed on Sep. 9, 2016.

(60) Provisional application No. 62/370,076, filed on Aug. 2, 2016, provisional application No. 62/256,626, filed on Nov. 17, 2015, provisional application No. 62/249,456, filed on Nov. 2, 2015, provisional application No. 62/240,794, filed on Oct. 13, 2015, provisional application No. 62/218,942, filed on Sep. 15, 2015, provisional application No. 62/216,859, filed on Sep. 10, 2015.

(51) Int. Cl.

| | | |
|---|---|---|
| *H04N 7/18* | (2006.01) | |
| *F24C 7/06* | (2006.01) | |
| *F24C 7/08* | (2006.01) | |
| *F24C 15/22* | (2006.01) | |
| *H05B 6/64* | (2006.01) | |
| *F24C 7/04* | (2006.01) | |
| *H04L 29/08* | (2006.01) | |
| *H04W 88/06* | (2009.01) | |

(52) U.S. Cl.
CPC ............. *F24C 15/16* (2013.01); *F24C 15/22* (2013.01); *H04L 67/125* (2013.01); *H04N 7/181* (2013.01); *H04N 7/183* (2013.01); *H05B 6/6417* (2013.01); *H05B 6/6441* (2013.01); *H05B 6/6452* (2013.01); *H05B 6/6455* (2013.01); *H05B 6/6482* (2013.01); *H04L 67/10* (2013.01); *H04L 67/12* (2013.01); *H04W 88/06* (2013.01)

(58) Field of Classification Search
CPC .. H05B 6/6482; H05B 6/6447; H05B 6/6494; H05B 6/6452; H05B 6/6417; F24C 7/04; F24C 7/043; F24C 7/085; F24C 7/087; F24C 7/06; F24C 7/062; F24C 7/065; F24C 7/08; F24C 7/046; F24C 15/16; F24C 15/166; F24C 15/22; H04N 5/332; H04N 5/335; H04N 5/247; H04N 7/181; H04N 7/183; H04W 88/06
See application file for complete search history.

(56) References Cited

U.S. PATENT DOCUMENTS

| | | | |
|---|---|---|---|
| 4,335,293 A | 6/1982 | Kobayashi et al. | |
| 4,473,732 A | 9/1984 | Payne | |
| 4,475,024 A | 10/1984 | Tateda et al. | |
| 4,771,154 A | 9/1988 | Bell et al. | |
| 4,800,090 A | 1/1989 | August | |
| 5,349,163 A | 9/1994 | An | |
| 5,665,259 A | 9/1997 | Westerberg | |
| 5,990,454 A | 11/1999 | Westerberg et al. | |
| 6,011,242 A | 1/2000 | Westerberg | |
| 6,013,900 A | 1/2000 | Westerberg et al. | |
| 6,069,345 A | 5/2000 | Westerberg | |
| 6,302,095 B1 | 10/2001 | Tolley et al. | |
| 6,417,494 B1 | 7/2002 | Westerberg et al. | |
| 6,448,540 B1 | 9/2002 | Wilhelm et al. | |
| 6,843,207 B2 | 1/2005 | Kanzaki et al. | |
| 7,075,442 B2 | 7/2006 | Lion et al. | |
| D541,578 S | 5/2007 | Jeon | |
| 7,323,663 B2 | 1/2008 | Cavada et al. | |
| D586,180 S | 2/2009 | Pino et al. | |
| D602,306 S | 10/2009 | Lavy | |
| 7,619,186 B2 | 11/2009 | Cavada et al. | |
| 7,683,292 B2 | 3/2010 | Cavada et al. | |
| D629,639 S | 12/2010 | Fernandez et al. | |
| 8,200,548 B2 | 6/2012 | Wiedl | |
| 8,791,398 B2 | 7/2014 | De la Cuerda Ortin et al. | |
| 8,929,724 B1 | 1/2015 | Mograbi | |
| 9,414,444 B2 | 8/2016 | Libman et al. | |
| 9,460,633 B2 | 10/2016 | Minvielle | |
| D771,995 S | 11/2016 | Bhogal et al. | |
| D771,996 S | 11/2016 | Bhogal et al. | |
| 9,528,972 B2 | 12/2016 | Minvielle | |
| D777,504 S | 1/2017 | Bhogal et al. | |
| D782,864 S | 4/2017 | Bhogal et al. | |
| D783,336 S | 4/2017 | Suh et al. | |
| D802,996 S | 11/2017 | Bhogal et al. | |
| 9,927,129 B2 | 3/2018 | Bhogal et al. | |
| 10,064,244 B2 * | 8/2018 | Cheng .................. F24C 7/085 |
| 2002/0171674 A1 | 11/2002 | Paris | |
| 2005/0173400 A1 | 8/2005 | Cavada et al. | |
| 2006/0289436 A1 | 12/2006 | Carbone et al. | |
| 2008/0259995 A1 | 10/2008 | Kuhn et al. | |
| 2009/0034944 A1 | 2/2009 | Burtea et al. | |
| 2009/0102083 A1 | 4/2009 | Cochran et al. | |
| 2009/0272814 A1 | 11/2009 | Granhed et al. | |
| 2010/0186600 A1 | 7/2010 | Lewis et al. | |
| 2010/0199857 A1 | 8/2010 | Storiz et al. | |
| 2011/0002675 A1 | 1/2011 | Cochran et al. | |
| 2011/0002677 A1 | 1/2011 | Cochran et al. | |
| 2011/0114627 A1 | 5/2011 | Burt | |
| 2011/0114633 A1 | 5/2011 | Niklasson et al. | |
| 2012/0063753 A1 | 3/2012 | Cochran et al. | |
| 2012/0180775 A1 | 7/2012 | Waltz et al. | |
| 2013/0202754 A1 | 8/2013 | Cochran et al. | |
| 2016/0033140 A1 | 2/2016 | Weaver, Jr. et al. | |
| 2016/0327279 A1 | 11/2016 | Bhogal et al. | |
| 2016/0348918 A1 | 12/2016 | Bhogal et al. | |
| 2017/0074522 A1 | 3/2017 | Cheng et al. | |
| 2017/0099988 A1 | 4/2017 | Matloubian et al. | |
| 2017/0211819 A1 | 7/2017 | McKee et al. | |
| 2017/0215233 A1 | 7/2017 | Katz et al. | |
| 2018/0128493 A1 | 5/2018 | Chen et al. | |
| 2018/0172510 A1 | 6/2018 | Rosen et al. | |
| 2018/0184668 A1 | 7/2018 | Stork gennant Wersborg | |

FOREIGN PATENT DOCUMENTS

| | | |
|---|---|---|
| DE | 10 2012 204229 | 9/2013 |
| EP | 1740018 | 1/2007 |
| EP | 2515044 | 10/2012 |
| EP | 2 662 628 | 11/2013 |
| JP | 2009052817 | 3/2009 |
| RU | 2006102663 | 8/2007 |
| RU | 2007111953 | 10/2008 |
| RU | 2008111110 | 9/2009 |
| RU | 110892 | 11/2011 |
| WO | WO 98/030941 | 7/1998 |
| WO | WO2014086486 | 9/2004 |
| WO | WO 2009/091145 | 7/2009 |
| WO | WO 2014/086487 | 6/2014 |
| WO | WO 2017/044876 | 3/2017 |

\* cited by examiner

400

```
┌─────────────────────────────────────────────────────────────┐
│ Select a cooking recipe that specifies a heat adjustment algorithm │
│                           402                               │
└─────────────────────────────────────────────────────────────┘
                              ↓
┌─────────────────────────────────────────────────────────────┐
│ Identify a food profile of an edible substance in or about to be in the │
│                      cooking instrument                     │
│                           404                               │
└─────────────────────────────────────────────────────────────┘
                              ↓
┌─────────────────────────────────────────────────────────────┐
│ Instantiate and/or configure, based on the cooking recipe and/or the │
│ food profile, the heat adjustment algorithm to control a heating process │
│                   of the edible substance                   │
│                           406                               │
└─────────────────────────────────────────────────────────────┘
                              ↓
┌─────────────────────────────────────────────────────────────┐
│            Update, in real-time, the input variables        │
│                           408                               │
└─────────────────────────────────────────────────────────────┘
                              ↓
┌─────────────────────────────────────────────────────────────┐
│ Re-adjust the driving parameters to the heating elements according to │
│              the heating adjustment algorithm               │
│                           410                               │
└─────────────────────────────────────────────────────────────┘
                              ↓
┌─────────────────────────────────────────────────────────────┐
│  Compute, based on the heating adjustment algorithm, when to │
│              terminate the heating process                  │
│                           412                               │
└─────────────────────────────────────────────────────────────┘
```

*FIG. 4*

VARIABLE PEAK WAVELENGTH COOKING INSTRUMENT WITH SUPPORT TRAY

CROSS-REFERENCE TO RELATED APPLICATIONS

This application is a continuation of U.S. patent application Ser. No. 15/490,768 filed Apr. 18, 2017 and entitled "VARIABLE PEAK WAVELENGTH COOKING INSTRUMENT WITH SUPPORT TRAY" which is hereby incorporated by reference in its entirety.

U.S. patent application Ser. No. 15/490,768 claims the benefit of U.S. Provisional Patent Application No. 62/370,076, filed Aug. 2, 2016 and entitled "VARIABLE PEAK WAVELENGTH COOKING INSTRUMENT WITH SUPPORT TRAY" and is a continuation-in-part of U.S. patent application Ser. No. 15/261,784, filed Sep. 9, 2016 and entitled "IN-OVEN CAMERA" that claims the benefit of U.S. Provisional Patent Application 62/256,626 filed Nov. 17, 2015 and entitled "CLOUD-BASED RECIPE STORE FOR CONFIGURABLE COOKING INSTRUMENT"; U.S. Provisional Patent Application No. 62/249,456 filed Nov. 2, 2015 and entitled "HEATING TECHNIQUE VIA FILAMENT WAVELENGTH TUNING"; U.S. Provisional Patent Application No. 62/240,794 filed Oct. 13, 2015 and entitled "TEMPERATURE PROBE ATTACHMENT WITHIN COOKING INSTRUMENT"; U.S. Provisional Patent Application No. 62/218,942 filed Sep. 15, 2015 and entitled "IN-OVEN CAMERA" and U.S. Provisional Patent Application No. 62/216,859 filed Sep. 10, 2015 and entitled "WIRELESS TEMPERATURE MEASUREMENT SYSTEM", which all are incorporated by reference herein in their entirety.

TECHNICAL FIELD

Various embodiments relate to cooking instruments, such as ovens.

BACKGROUND

The art of cooking remains an "art" at least partially because of the food industry's inability to help cooks to produce systematically award worthy dishes. To make a full course meal, a cook often has to use multiple cooking instruments, understand the heating patterns of the cooking instruments, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be produced systematically using conventional cooking instruments automatically. The industry has yet been able to create an intelligent cooking instrument capable of automatically and consistently producing complex meals with precision, speed, and lack of unnecessary human intervention.

BRIEF DESCRIPTION OF THE DRAWINGS

FIG. 4 is a flowchart illustrating a method of operating a cooking instrument to cook food, in accordance with various embodiments.

Figure 1:
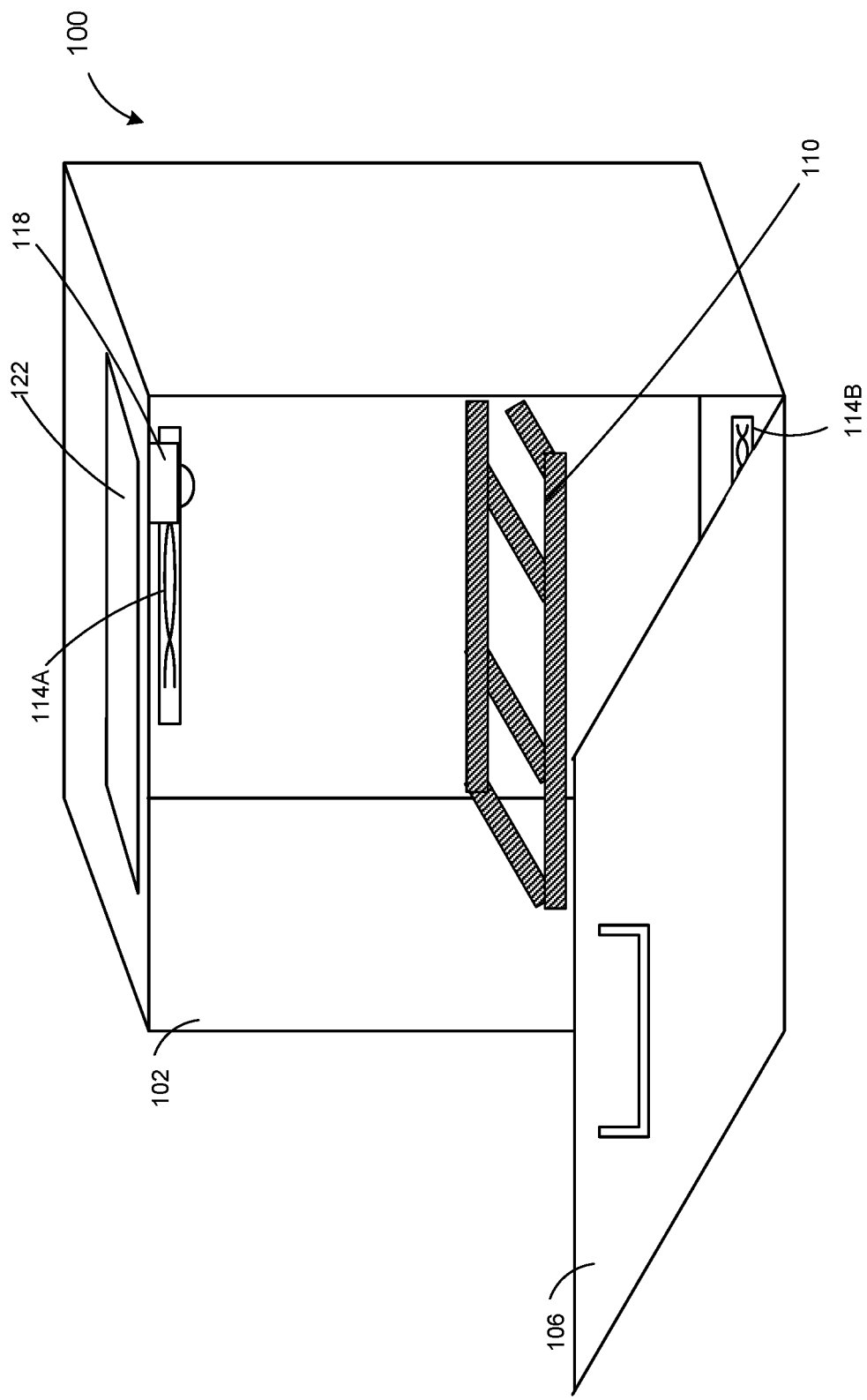
FIG. 1 is a structural diagram of a perspective view of a cooking instrument, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments describe a cooking instrument (e.g., with an enclosed cooking chamber and a heating system therein). The cooking instrument can be referred to as an oven or a cooking appliance. The cooking instrument can have one or more heating elements controlled by a computing device (e.g., a computer processing unit (CPU), a controller, application specific integrated circuit (ASIC), or any combination thereof). The computing device can control the peak emission wavelength and/or the spectral power distribution of the heating elements. For example, each heating element can include one or more filament assembly, one or more drivers that receives commands from a computing device and adjust the power, peak wavelength, and/or spectral power distribution of waves emitted from the filament assembly, a containment vessel, or any combination thereof. The computing device can control the filament assemblies (e.g., individually or as a whole) by controlling the electric signals driving these filament assemblies. For example, the computing device can change driving power, average electrical current level, driving signal pattern, driving signal frequency, or any combination thereof by targeting different material in a cooking chamber of the cooking instrument to heat. For example, the peak wavelength of waves emitted by a filament assembly can coincide with excitable wavelength of meat, water, a glass tray in the cooking instrument, interior chamber wall of the cooking instrument, containment vessels (e.g., envelope) of the filament assemblies, or any combination thereof. The computing device can implement an interactive user interface to control the cooking instrument. For example, the interactive user interface can be implemented on a touchscreen of the cooking instrument or a mobile device connected to the computing device of the cooking instrument. Each cooking recipe can include one or more heat adjustment algorithms.

The cooking instrument can execute a heat adjustment algorithm (e.g., also referred to as "heating logic") based on a cooking recipe (e.g., a set of instructions to operate a cooking instrument). In some embodiments, the disclosed cooking instrument can directly emulate one or more types of conventional cooking instruments (e.g., a convection oven, a baking oven, a kiln, a grill, a roaster, a furnace, a range, a microwave, a smoker, or any combination thereof). In some embodiments, the cooking instrument can download (e.g., directly or indirectly) one or more cooking recipes from an external computer server system.

Various embodiments pertain to a cooking instrument with specially selected materials within its cooking chamber to enable a heating system (e.g., an infrared based heating system) to choose how to transfer heat to food within the cooking instrument. This includes transferring heat: (a) directly to the food via emitted radio frequency (RF) energy substantially within optical spectrum, visible and near visible spectrum, infrared spectrum, or any combination thereof; (b) indirectly to the food by directly transferring heat to a cooking platform or a support tray that is in contact with the food; (c) indirectly to the food by directly transferring heat to an envelope of a heating element that heats the air within the cooking chamber, which air in turn heats the food. For example, some embodiments include an oven (e.g., the cooking instrument 100) that comprises: a cooking chamber (e.g., the chamber 102); a support tray (e.g., the cooking platform 110 or the tray 516) adapted to hold food in the cooking chamber; a heating system (e.g., the heating elements 114); and a control system (e.g., the computing device 206). The heating system can includes one or more heating elements. The heating elements can be configured to emit energy partially or substantially in the infrared energy spectrum. The heating elements can be substantially directional or at least not omnidirectional. Each heating element can include one or more filaments (e.g., one of the filament assemblies 228 or the filament assemblies 506); a containment vessel (e.g., one of the containment vessel 232 or the containment vessel 508), as an envelope of the heating element, surrounding the filaments; and an electric signal driver or modulator (e.g., one of the filament drivers 224) to drive the filaments. In some cases, the material of the support tray has an absorption band that is at least partially different from an absorption band of the envelope.

The control system can be configured to: receive an instruction to cook food in the cooking chamber according to a digital recipe; and vary, according to the instruction, an emission spectrum (e.g., varying the peak wavelength of the emission spectrum) emitted by the heating element to specifically and directly transfer heat to the support tray, an envelope of the heating element, a specific type of edible material in the food (e.g., water molecules, lipids, proteins, etc.), or any combination thereof. In some embodiments, the material of the support tray has an absorption band that is at least partially different from the absorption band of the envelope. An absorption band is a range of wavelengths, frequencies or energies in the electromagnetic spectrum which are characteristic of a particular transition from initial to final state in a substance. This enables the heating system to directly transfer heat to either the envelope or the support tray independently, thereby enabling different ways of indirectly heating the food. In some cases, the absorption band of the support tray substantially lacks overlap with the absorption band of the envelope. In another case, the absorption band of the support tray does overlap with the absorption band of the envelope, but each absorption band has sufficient nonoverlapping portions such that the heating system can directly transfer heat to one or another.

A digital recipe can include one or more instructions to operate the heating system. Each instruction can specify an emission configuration (e.g., emission spectrum and/or intensity) for a set duration or until a detectable condition (e.g., a condition determinable by the control system based on sensor data and/or user input) is met. In one example, the heating system can specifically excite (e.g., specifically and directly transfer heat via emitted waves) the support tray by disproportionally heating the support tray relative to other materials in the cooking chamber. Disproportionally heating the support tray can include directly transferring heat to the support tray without directly transferring heat to the envelope or the food. In another example, the heating system can specifically excite the envelope (e.g., and thereby air in the cooking chamber) without directly transferring heat to the support tray or the food. In another example, the heating system can specifically excite an edible material without directly transferring heat to the support tray or the envelope.

The oven can further comprise a reflector for the heating element to reflect emission of the heating element. The reflector can be a coating on an outer surface of the heating element that faces away from the support tray. The material of the reflector can be substantially ceramic (e.g., zirconium dioxide). The reflector can be adapted to be spaced apart from the heating element at a distance such that, together the heating element and the reflector have anti-fouling characteristics and are capable of disintegrating (e.g., burning or vaporizing) any food debris in the space therebetween.

Some embodiments pertain to a cooking instrument that comprises: a cooking chamber; a support tray adapted to hold food in the cooking chamber; a heating system comprised of a heating element capable of emitting waves at different peak emission wavelengths; and a control system configured to drive the heating element to emit at a first peak wavelength such that the support tray is substantially opaque to waves emitted from the heating element and at a second peak wavelength such that the support tray is substantially transparent to waves emitted from the heating element. For example, "substantially transparent" can mean that the emitted waves would pass through the support tray and "substantially opaque" can mean that the emitted waves would be absorbed by the support tray and thereby directly heat the support tray. The first peak wavelength can be 3 microns or above. The second peak wavelength can be shorter than 3 microns. The control system can be configured to drive the heating element at a third peak wavelength such that the support tray is heated by waves emitted from the heating element without heating any food on the support tray. For example, the third peak wavelength is between 3 microns and 4 microns. The support tray can have an optically transparent region enabling visible light to substantially travel through two opposing surfaces of the support tray. The support tray can include a reflective portion to enable a top side camera to capture a bottom view of the food resting on the support tray. For example, the support tray is comprised of glass. For example, the support tray comprises borosilicate glass (e.g., pure borosilicate glass or a mixture such as Pyrex©).

Some embodiments pertain to a cooking instrument that comprises: a cooking chamber; a support tray adapted to hold food in the cooking chamber; and a heating system comprised of a plurality of heating elements. The heating system has structures and circuitry that is capable of emitting waves at different peak emission wavelengths. The heating system may be adapted to emit waves according to a first particular configuration such that the emitted waves are substantially transparent to the support tray. For example, the peak wavelength of the emitting waves at the particular configuration can be outside of the absorption band of the material(s) of the support tray. The heating system can produce the waves according to an emission spectrum specified by the first particular configuration such that an area under the emission spectrum is outside of the absorption band of the material(s) of the support tray. In some embodiments, the heating system may be adapted to emit waves according to a second particular configuration such that the emitted ways are substantially opaque to the support tray.

In some cases, at least one of the heating elements is operable to modulate at a peak wavelength that corresponds to an excitable wavelength of the support tray. The heating system is capable of applying different heating patterns to different zones on the support tray. The heating system can have circuitry to supply different amounts of power respectively to at least two different heating elements of the heating system. The heating system can have circuitry to drive the heating elements at varying peak wavelengths tailored to excite different materials. The cooking instrument can further comprise a perforated metallic sheet between the support tray and at least one of the heating elements. The heating system can be configured to apply different heating patterns to different zones on the support tray by using the perforated metallic sheet to spatially block portions of waves emitted by the at least one of the heating elements. The heating system can be configured to apply, simultaneously, different heating configurations (e.g., different intensities and/or emission spectrums) to the different zones on the support tray. The different zones can be parts of the support tray or regions of food resting on the support tray. The plurality of heating elements can include a first set of one or more heating elements disposed directly above the support tray and a second set of one or more heating elements disposed directly below the support tray. In one example, each heating element of the first set can be longitudinally extended in an angle that is substantially perpendicular to each heating element of the second set. In another example, each heating element of the first set are non-uniformly spaced apart.

Some embodiments include a cooking instrument, comprising: a cooking chamber; a support tray adapted to hold food in the cooking chamber; and an infrared-based heating system comprised of a heating element. The heating element is capable of emitting waves according to a particular configuration such that the support tray is substantially transparent to the emitted waves. An envelope of the heating element is substantially transparent to the emitted waves. The emitted waves can directly transfer energy to the food. The infrared-based heating system can include a plurality of heating elements. The support tray can be composed of one or more materials. The peak wavelength of waves emitted by the heating system at the particular configuration is outside of the absorption band of the one or more materials. The heating system is capable of emitting waves according to an emission spectrum specified by the particular configuration. An area under the emission spectrum can outside of an absorption band of the one or more materials.

Some embodiments include a cooking instrument, comprising: a cooking chamber; a support tray adapted to hold food in the cooking chamber; and an infrared-based heating system comprised of at least a heating element. The heating system is capable of emitting waves according to a particular configuration such that the support tray is substantially opaque to the emitted waves and an envelope of the heating element is substantially transparent to the emitted waves.

FIG. 1 is a structural diagram of a perspective view of a cooking instrument 100, in accordance with various embodiments. The cooking instrument 100 can include a chamber 102 having a door 106. At least one cooking platform 110 is disposed inside the chamber 102. The cooking platform 110 can be a tray, a rack, or any combination thereof. The chamber 102 can be lined with one or more heating elements 114 (e.g., a heating element 114A, a heating element 114B, etc., collectively as the "heating elements 114"). Each of heating elements 114 can include a wavelength controllable filament assembly. The wavelength controllable filament assembly is capable of independently adjusting an emission frequency/wavelength, emission power, and/or emission signal pattern in response to a command from a computing device (not shown) of the cooking instrument 100.

In several embodiments, the chamber 102 is windowless. That is, the chamber 102, including the door 106, is entirely enclosed without any transparent (and/or semitransparent) parts when the door 106 is closed. For example, the chamber 102 can be sealed within a metal enclosure (e.g., with thermal insulation from/to the outside of the chamber 102) when the door 106 is closed. A camera 118 can be attached to an interior of the chamber 102. In some embodiments, the camera 118 is attached to the door 106. For example, the camera 118 can face inward toward the interior of the chamber 102 when the door 106 is closed and upward when the door 106 is opened as illustrated. In some embodiments, the camera 118 is installed on the ceiling (e.g., top interior surface) of the chamber 102. The camera 118 can be attached to the door 106 or proximate (e.g., within three inches) to the door 106 on the ceiling of the chamber 102 to enable easy cleaning, convenient scanning of labels, privacy, heat damage avoidance, etc.

In several embodiments, the heating elements 114 include one or more wavelength-controllable filament assemblies at one or more locations in the chamber. In some embodiments, each of the one or more wavelength-controllable filament assemblies is capable of independently adjusting its emission frequency (e.g., peak emission frequency) and/or its emission power. For example, the peak emission frequency of the wavelength-controllable filament assemblies can be tuned within a broad band range (e.g. from 20 terahertz to 300 terahertz). Different frequencies can correspond to different penetration depth for heating the food substances, other items within the chamber 102, and/or parts of the cooking instrument 100.

The heating elements can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking instrument 100 can hold the power constant while lowering the peak emission frequency by activating more heating elements, each at a lower power. The cooking instrument 100 can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In some embodiments, the camera 118 includes an infrared sensor to provide thermal images to the computing device as feedback to a heat adjustment algorithm. In some embodiments, the cooking instrument 100 includes multiple cameras. In some embodiments, the camera 118 includes a protective shell. In some embodiments, the heating elements 114 and the camera 118 are disposed in the chamber 102 such that the camera 118 is not directly between any pairing of the heating elements. For example, the heating elements 114 can be disposed along two vertical walls perpendicular to the door 106. The heating elements 114 can be quartz tubes (e.g., with heating filaments therein) that runs horizontally on the vertical walls and perpendicular to the door 106.

In some embodiments, a display 122 is attached to the door 106. The display 122 can be a touchscreen display. The display 122 can be attached to an exterior of the chamber 102 on an opposite side of the door 106 from the camera 118. The display 122 can be configured to display a real-time image or a real-time video of the interior of the chamber captured by and/or streamed from the camera 118.

Figure 2:
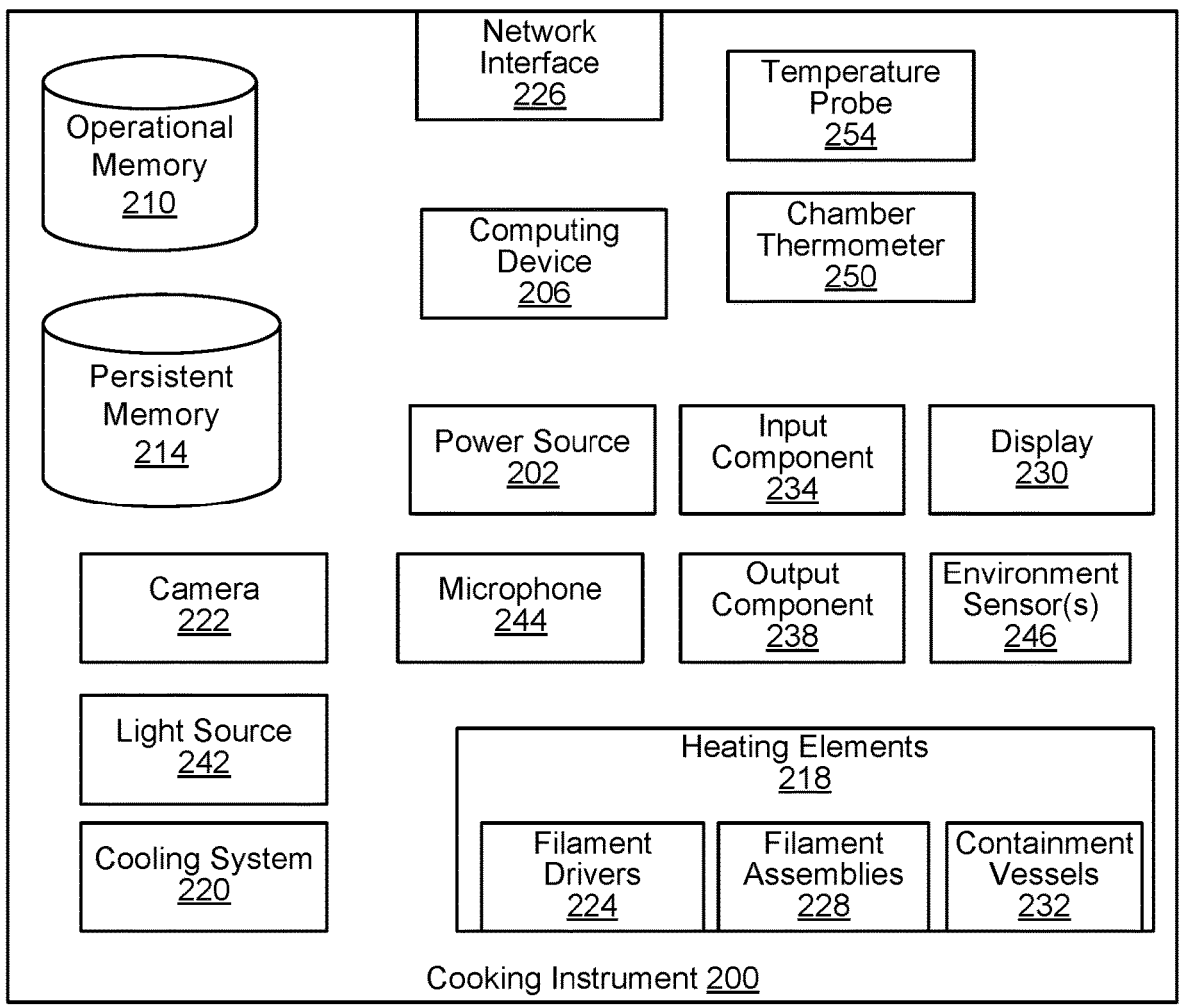
FIG. 2 is a block diagram illustrating physical components of a cooking instrument, in accordance with various embodiments.

FIG. 2 is a block diagram illustrating physical components of a cooking instrument 200 (e.g., the cooking instrument 100), in accordance with various embodiments. The cooking instrument 200 can include a power source 202, a computing device 206, an operational memory 210, a persistent memory 214, one or more heating elements 218 (e.g., the heating elements 114), a cooling system 220, a camera 222 (e.g., the camera 118), a network interface 226, a display 230 (e.g., the display 122), an input component 234, an output component 238, a light source 242, a microphone 244, one or more environment sensors 246, a chamber thermometer 250, a temperature probe 254, or any combination thereof.

The computing device 206, for example, can be a control circuit. The control circuit can be an application-specific integrated circuit or a circuit with a general-purpose processor configured by executable instructions stored in the operational memory 210 and/or the persistent memory 214. The computing device 106 can control all or at least a subset of the physical components and/or functional components of the cooking instrument 200.

The power source 202 provides the power necessary to operate the physical components of the cooking instrument 200. For example, the power source 202 can convert alternating current (AC) power to direct current (DC) power for the physical components. In some embodiments, the power source 202 can run a first powertrain to the heating elements 218 and a second powertrain to the other components.

The computing device 206 can control peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking instrument 200. For example, the persistent memory 214 can store one or more cooking recipes, which are sets of operational instructions and schedules to drive the heating elements 218. The operational memory 210 can provide runtime memory to execute the functional components of the computing device 206. In some embodiments, the persistent memory 214 and/or the operational memory 210 can store image files or video files captured by the camera 222.

The heating elements 218 can be wavelength controllable. For example, the heating elements 218 can include quartz tubes, each enclosing one or more heating filaments. In various embodiments, the side of the quartz tubes facing toward the chamber wall instead of the interior of the chamber is coated with a heat resistant coating. However, because the operating temperature of the heating filaments can be extremely high, the cooling system 220 provides convection cooling to prevent the heat resistant coating from melting or vaporizing.

The heating elements 218 can respectively include filament drivers 224, filament assemblies 228, and containment vessels 232. For example, each heating element can include a filament assembly housed by a containment vessel. The filament assembly can be driven by a filament driver. In turn, the filament driver can be controlled by the computing device 206. For example, the computing device 206 can instruct the power source 202 to provide a set amount of DC power to the filament driver. In turn, the computing device 306 can instruct the filament driver to drive the filament assembly to generate electromagnetic waves at a set peak wavelength.

The camera 222 serves various functions in the operation of the cooking instrument 200. For example, the camera 222 and the display 230 together can provide a virtual window to the inside of the chamber despite the cooking instrument 200 being windowless. The camera 222 can serve as a food package label scanner that configures the cooking instrument 200 by recognizing a machine-readable optical label of the food packages. In some embodiments, the camera 222 can enable the computing device 206 to use optical feedback when executing a cooking recipe. In several embodiments, the light source 242 can illuminate the interior of the cooking instrument 200 such that the camera 222 can clearly capture an image of the food substance therein.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the camera 222. The display 230 can also present a control interface implemented by the computing device 206. The input component 234 can be a touch panel overlaid with the display 230 (e.g., collectively as a touchscreen display). In some embodiments, the input component 234 is one or more mechanical buttons. In some embodiments, the output component 238 is the display 230. In some embodiments, the output component 238 is a speaker or one or more external lights.

In some embodiments, the cooking instrument 200 includes the microphone 244, and/or the one or more environment sensors 246. For example, the computing device 206 can utilize the audio signal, similar to images from the camera 222, from the microphone 244 as dynamic feedback to adjust the controls of the heating elements 218 in real-time according to a heat adjustment algorithm. In one example, the audio signal can signify a fire alarm, a smoke alarm, popcorn being popped, or any combination thereof. The environment sensors 246 can include a pressure sensor, a humidity sensor, a smoke sensor, a pollutant sensor, or any combination thereof. The computing device 206 can also utilize the outputs of the environment sensors 246 as dynamic feedback to adjust the controls of the heating elements 218 in real-time according to a heat adjustment algorithm.

In some embodiments, the cooking instrument 200 includes the chamber thermometer 250, and/or the temperature probe 254. For example, the computing device 206 can utilize the temperature readings from the chamber thermometer 250 as dynamic feedback to adjust the controls of the heating elements 218 in real-time according to a heat adjustment algorithm. The temperature probe 254 can be adapted to be inserted into food to be cooked by the cooking instrument 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the food should be heated at a preset temperature for a preset amount time according to the cooking recipe.

Figure 3:
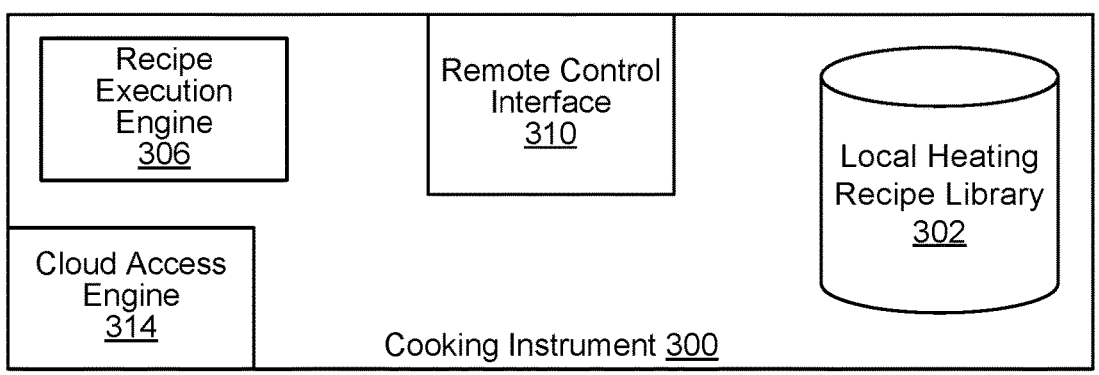
FIG. 3 is a block diagram illustrating functional components of a cooking instrument, in accordance with various embodiments.

FIG. 3 is a block diagram illustrating functional components of a cooking instrument 300 (e.g., the cooking instrument 100 and/or the cooking instrument 200), in accordance with various embodiments. For example, the functional components can run on the computing device 206 or one or more specialized circuits. For example, the cooking instrument 300 can implement at least a cooking recipe library 302, a recipe execution engine 306, a remote control interface 310, a cloud access engine 314, or any combination thereof.

In some embodiments, the recipe execution engine 306 can analyze an image from a camera (e.g., the camera 222) to determine whether a door (e.g., the door 106) is open. For example, the image from the camera may be illuminated by a specific color of a specific light source (e.g., the light source 242) when facing toward an interior of the cooking instrument 300. In some embodiments, the recipe execution engine 306 is configured to analyze an image from the camera to determine whether a machine-readable optical label is within the image. For example, the recipe execution engine 306 can be configured to select a cooking recipe from the cooking recipe library 302 based on the machine-readable optical label. In some embodiments, the remote control interface 310 is configured to send a message to a user device to confirm the automatically selected cooking recipe. In some embodiments, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating configuration schedule by controlling the heating elements according to the cooking recipe and a heat adjustment algorithm specified therein. The heat adjustment algorithm is capable of dynamically controlling the heating elements 218 (e.g., adjusting output power, spectral power distribution, and/or peak wavelength) in real-time in response to changing input variables.

The remote control interface 310 can be used to interact with a user. For example, a user device (e.g., a computer or a mobile device) can connect to the remote control interface via the network interface 226. Via this connection, the user can configure the cooking instrument 300 in real-time. In one example, the user can select a cooking recipe via a user-device-side application. The user-device-side application can communicate the remote control interface 310 to cause the cooking instrument 300 to execute the selected cooking recipe. The cloud access engine 314 can enable the cooking instrument 300 to access a cloud service to facilitate execution of a cooking recipe or update the cooking recipes in the cooking recipe library 302.

Components (e.g., physical or functional) associated with the cooking instrument can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

FIG. 4 is a flowchart illustrating a method 400 of operating the cooking instrument (e.g., the cooking instrument 100, the cooking instrument 200, and/or the cooking instrument 300) to cook an food, in accordance with various embodiments. The method 400 can be controlled by a computing device (e.g., the computing device 206).

At step 402, the computing device can select a cooking recipe (e.g., from a local cooking recipe library stored in the local memory (e.g., the operational memory 210 and/or the persistent memory 214) of the computing device and/or the cooking instrument, a heating library implemented by a cloud service accessible through a network interface (e.g., the network interface 226), or another external source connected to the computing device). Optionally, at step 404, the computing device can identify a food profile of an food in or about to be in the cooking instrument. For example, the computing device can utilize a camera to identify the food profile (e.g., performing image recognition of the food or scanning a digital label attached to an outer package of the food). The food profile can identify the size of the food, the weight of the food, the shape of the food, the current temperature of the food, or any combination thereof.

At step 406, the computing device can instantiate and/or configure, based on the cooking recipe and/or the food profile, a heat adjustment algorithm to control a heating process of the food. The heat adjustment algorithm specifies how to adjust the driving parameters of one or more heating elements in the cooking instrument based on input variables that may change over time. Input variables can include time lapsed (e.g., from when the heating elements are first driven and/or when the heating process first begins), temperature within the cooking instrument, user input via an external device connected to the computing device or a control panel of the cooking instrument, temperature within the food (e.g., as reported by a temperature probe inserted into the food), real-time image analysis of the food, real-time audio signal analysis from a microphone inside or outside of the cooking instrument, real-time environment sensor outputs analysis, or any combination thereof. At step 408, the computing device can update, in real-time, the input variables and, at step 410, re-adjust the driving parameters to the heating elements according to the heating adjustment algorithm.

Part of the adjustment made by the heat adjustment algorithm can include heat intensity, peak wavelength (e.g., for targeting different food or material within the cooking chamber), heat duration, topical heat location (e.g., zones), or any combination thereof. The computing device can configured the heating elements to apply different heating patterns to different zones on a tray in the cooking instrument. The different zones can be portions of the tray or regions of food resting on the tray. The computing device can configure the heating elements to apply, simultaneously or sequentially, different heating patterns (e.g., heating levels) to different zones (e.g., areas above the tray) on the support tray by supplying different amount of power to different heating elements. The computing device can configure the heating elements to apply different heating patterns to different zones on the support tray by driving the heating elements of the heating system at varying peak wavelengths. The cooking instrument can include a perforated metallic sheet between the tray and at least one of the heating elements. The computing device can configure the heating elements to apply different heating patterns to different zones on the support tray by using the perforated metallic sheet to spatially block portions of waves emitted by the at least one of the heating elements.

At step 412, the computing device can compute, based on the heating adjustment algorithm, when to terminate the heating process (e.g., when the cooking instrument stops supplying power to the heating elements). In some embodiments, the heating adjustment algorithm takes into account whether the food is expected to be extracted out of the cooking instrument substantially immediately after the termination of the heating process (e.g., a high-speed mode). For example, the heating adjustment algorithm can shorten the expected termination time if the user indicates that the food will remain in the cooking instrument a preset duration after the termination of the heating process (e.g., a low stress mode).

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 5A:
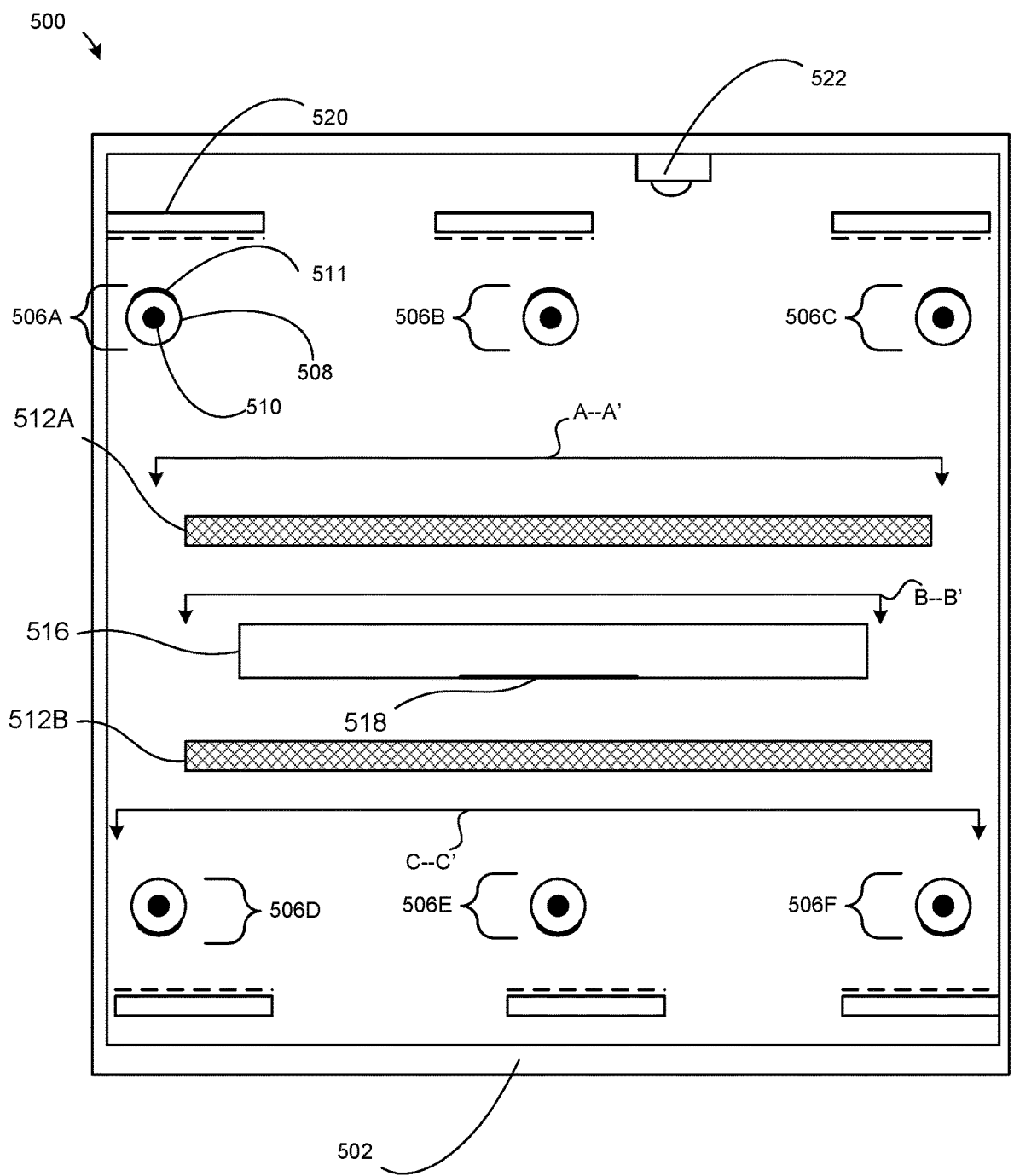
FIG. 5A is a cross-sectional front view of a first example of a cooking instrument, in accordance with various embodiments.

FIG. 5A is a cross-sectional front view of a first example of a cooking instrument 500 (e.g., the cooking instrument 100, the cooking instrument 200, and/or the cooking instrument 300), in accordance with various embodiments. The cooking instrument 500 includes a chamber 502 and one or more filament assemblies 506 (e.g., a filament assembly 506A, a filament assembly 506B, a filament assembly 506C, a filament assembly 506D, a filament assembly 506E, a filament assembly 506F, etc., collectively as the "filament assemblies 506") at One or more locations in the chamber 502. The filament assemblies 506 can be part of the heating elements of the cooking instrument 500. Each of the filament assemblies 506 can include a containment vessel 508 surrounding a filament 510. The containment vessel 508 can be coated with reflective material to serve as a reflector 511. This way, the reflector 511 is prevented from being fouled by debris. The containment vessel 508 can be made of quartz. The reflective material can be gold or white ceramics, such as zirconium oxide, silicon oxide, etc. The filament assemblies 506 can be tungsten halogen assemblies. The reflective material can be coated on a portion of an outer surface of each heating element that faces away from a tray 516.

A computing device (e.g., the computing device 206) can be configured to control the peak emission wavelengths of the filament assemblies 506. For example, the computing device can be configured to identify a food profile associated with food (e.g., in the chamber 502) based on sensor input (e.g., camera scanning a label) or the user input. The computing device can then determine one or more excitable wavelengths associated with the food profile. The computing device can drive the filament assemblies 506 to emit at a peak emission wavelength corresponding to at least one of the excitable wavelengths to heat the food.

In some embodiments, the chamber 502 is entirely enclosed in metal. In some embodiments, the chamber 502 has the door. In some embodiments, the chamber 502 has one or more transparent windows (e.g., glass windows). In some embodiments, one or more perforated metal sheets 512 (e.g., a perforated metal sheet 512A and/or a perforated metal sheet 512B, collectively as the "perforated metal sheets 512") are disposed within the chamber 502. In some embodiments, there is only a single perforated metal sheet in the chamber 502 (e.g., above the tray 516 or below the tray 516). In some embodiments, there are two perforated metal sheets (as shown). Each of the perforated metal sheets 512 can be a removable or fixated panel. The perforated metal sheets 512 can enable control of heating concentration along a horizontal plane parallel its surface. Perforated metal sheets, such as a perforated aluminum foil, can be used to shield certain food items from the intense radiant heat generated by the heating elements. For example, when cooking a steak and vegetables side-by-side, the perforated metal sheets can shield the vegetables from being overcooked and enable the steak to receive the full power from the heating elements. Longer wavelength emission from the filament assemblies 506 can penetrate perforations more equally compared to shorter wavelength. Hence even if the perforations were designed to shield, for example, 90% of direct radiant heat, the cooking instrument can still independently tune the heating by varying the wavelength. This enables some control of side-by-side cooking in addition to direct radiant heating.

In some embodiments, the chamber 502 includes the tray 516 (e.g., the cooking platform 110) in the chamber 502. In some embodiments, the tray 516 includes or is part of at least one of the one or more perforated metal sheets 512. The computing device can be configured to drive the heating elements to emit at a peak emission wavelength corresponding to excitable wavelength for the tray 516. By tuning the peak emission wavelength to the excitable wavelength of the tray 516, the computing device can heat up the tray 516 without directly heating the air or the food inside the chamber 502.

The tray 516 can be made of glass. The tray 516 can include an optically transparent region enabling visible light to substantially travel through two opposing surfaces of the tray 516. For example, a user of the cooking instrument 500 can place an instruction sheet beneath the tray 516 while arranging food on the tray 516 to be cooked. The user can directly overlay specific food at the desired location according to the instruction sheet. The tray 516 can include a reflective portion 518 to enable a top side camera 522 to capture a bottom view of food resting on the tray 516.

The cooking instrument 500 can include an airflow-based cooling system 520. The airflow-based cooling system 520 can blow directly onto a reflector portion of the containment vessel 508 to cool (e.g., prevent vaporization of the reflective coating) and improve performance of the reflector 511. The airflow can be controlled to provide impingement convection heating. The airflow-based cooling system 520 can have an air path that filters steam and thus prevents hot air from escaping when the door of the cooking instrument 500 is opened. The air path can also be configured to go over a camera (not shown) of the cooking instrument 500 to keep the lens of the camera condensation free.

In some embodiments, a fan can be installed away from the filament assemblies 506. When the peak wavelength of a filament assembly is configured to heat the envelope and/or the containment vessel 508, the fan can stir the air within the chamber 502 to ensure that heated air adjacent to the containment vessels 508 is moved to other parts of the chamber 502 to cook the food.

In some embodiments, the cooking instrument 500 lacks a crumb tray. For example, the cooking instrument 500 can use quartz or other heat resistant sheet to cover the heating elements so that the bottom of the cooking instrument chamber has no heating elements to trip over. The heat resistant sheet can be transparent at the operating wavelengths of the filament assemblies 506 to enable for the emission from the heating elements to penetrate through without much loss.

In some embodiments, the computing device within the cooking instrument 500 can drive the filament assemblies 506 according to instructions in a cooking recipe. For example, the computing device can drive at least one of the filament assemblies 506 at a specific peak wavelength. The specific peak wavelength can correspond to excitable wavelengths of the materials in the support tray, the containment vessel 508 (e.g., envelope of the filament assembly), a specific type of edible material, water molecules, or any combination thereof. By matching the specific peak wavelength, the computing device can target specific material for heating. For example, the computing device can drive at least one of the heating elements at a peak wavelength (e.g., 3 µm or above for glass trays) such that the support tray is substantially opaque to waves emitted from the at least one of the heating elements. The computing device can drive at least one of the heating elements at a peak wavelength (e.g., 3 µm or less for glass trays) such that the support tray is substantially transparent to waves emitted from the at least one of the heating elements. The computing device can drive at least one of the heating elements at a peak wavelength (e.g., between 3 µm and 4 µm for glass trays) such that the support tray is heated by waves emitted from the at least one of the heating elements without heating any organic food in the cooking chamber.

Figure 5B:
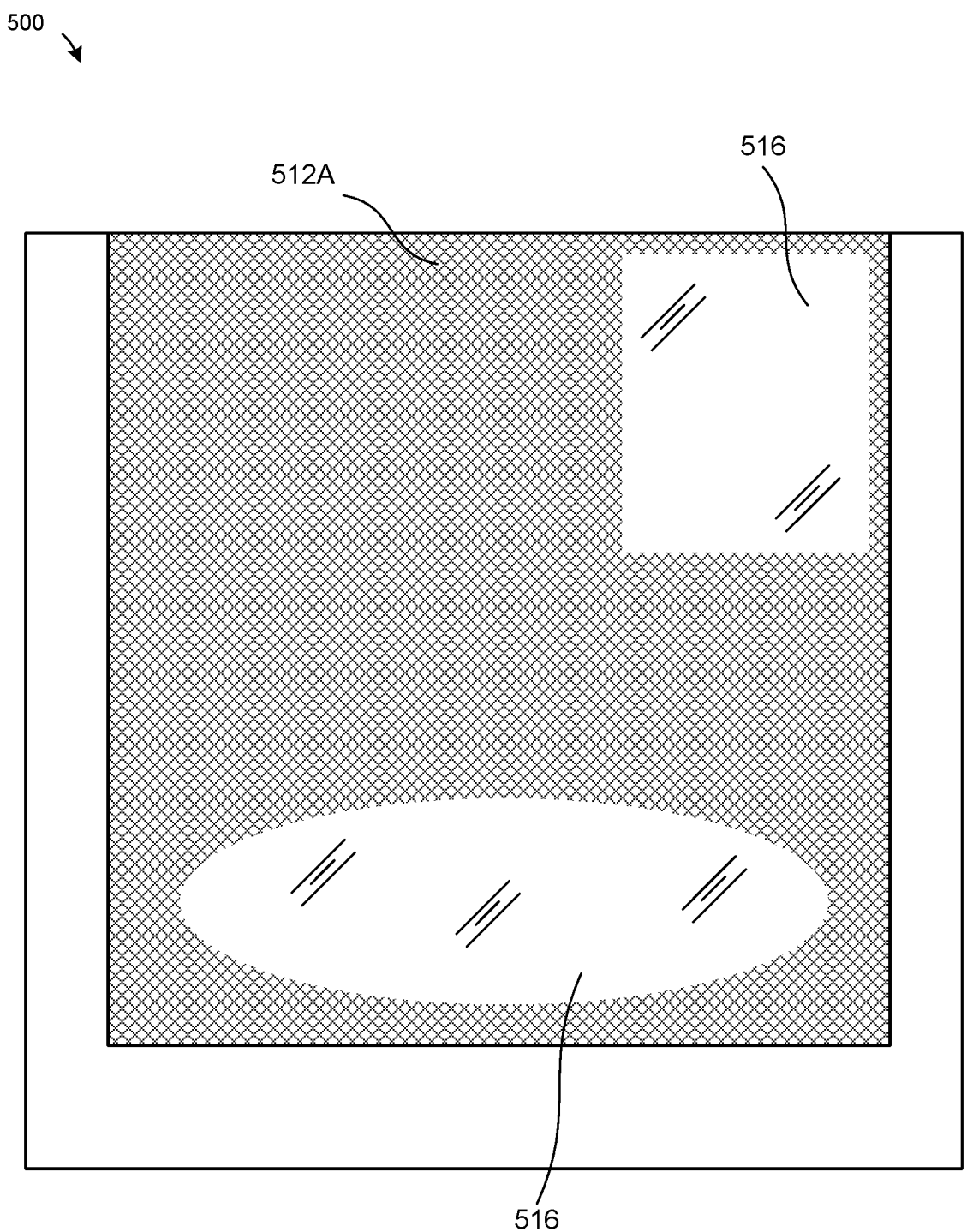
FIG. 5B is a cross-sectional top view of the cooking instrument of FIG. 5A along lines A-A', in accordance with various embodiments.
Figure 5C:
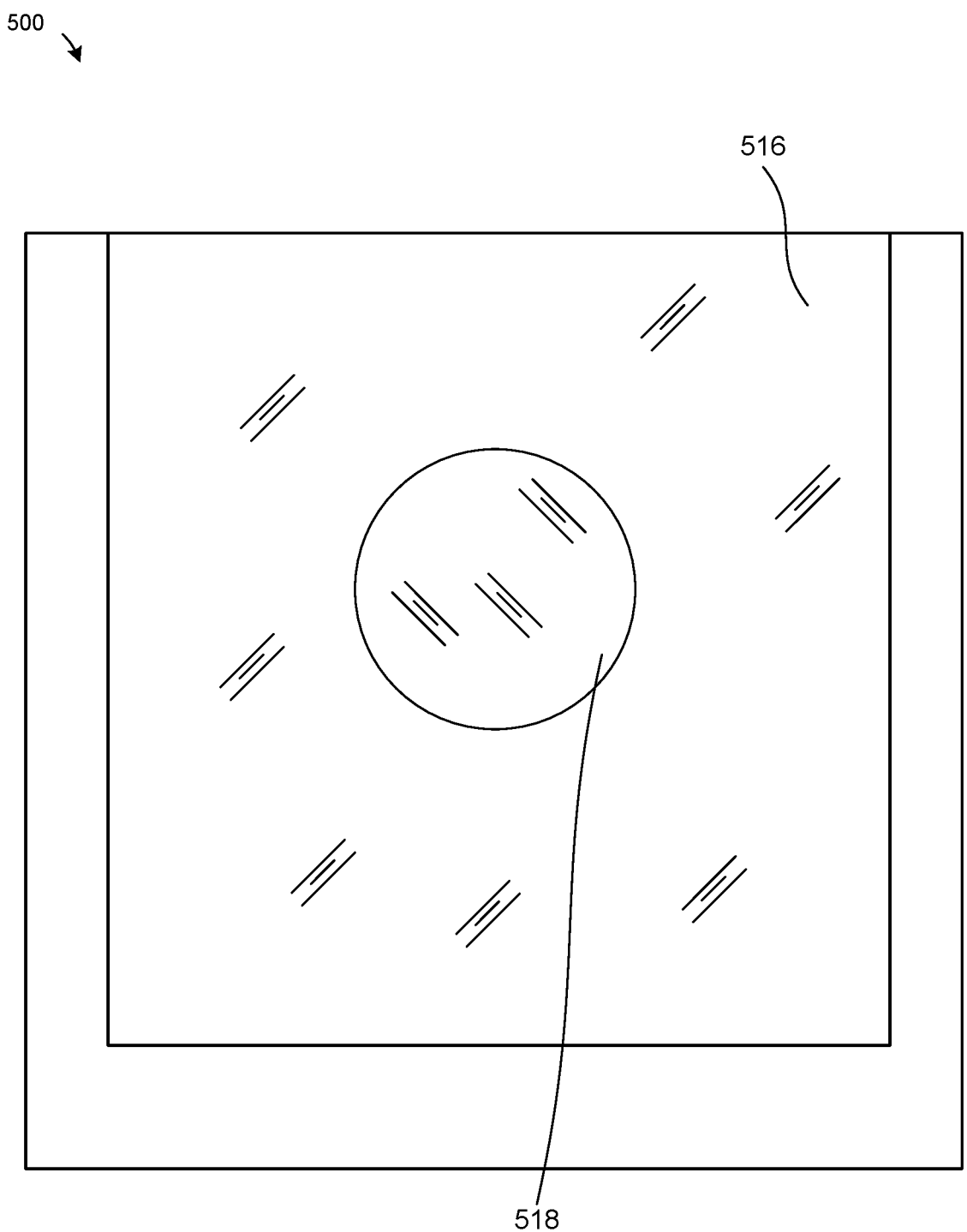
FIG. 5C is a cross-sectional top view of the cooking instrument of FIG. 5A along lines B-B', in accordance with various embodiments.
Figure 5D:
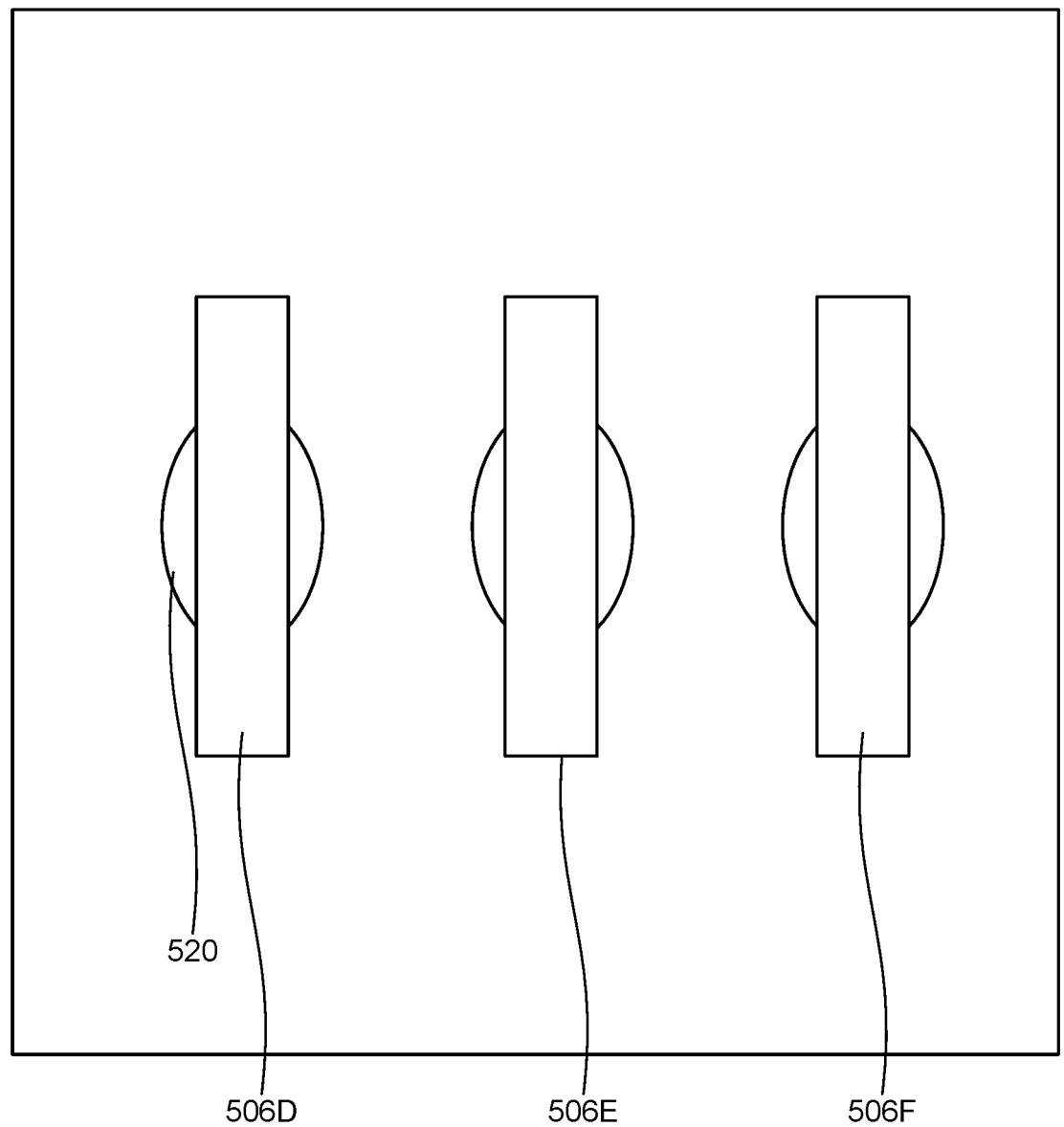
FIG. 5D is a cross-sectional top view of the cooking instrument of FIG. 5A along lines C-C', in accordance with various embodiments.

FIG. 5B is a cross-sectional top view of the cooking instrument 500 of FIG. 5A along lines A-A', in accordance with various embodiments. FIG. 5B can illustrate the perforated metal sheet 512A and cavities within the perforated metal sheet 512A that exposes the tray 516. FIG. 5C is a cross-sectional top view of the cooking instrument 500 of FIG. 5A along lines B-B', in accordance with various embodiments. FIG. 5C can illustrate the tray 516. FIG. 5D is a cross-sectional top view of the cooking instrument 500 of FIG. 5A along lines C-C', in accordance with various embodiments. FIG. 5D can illustrate the filament assemblies 506.

Figure 6:
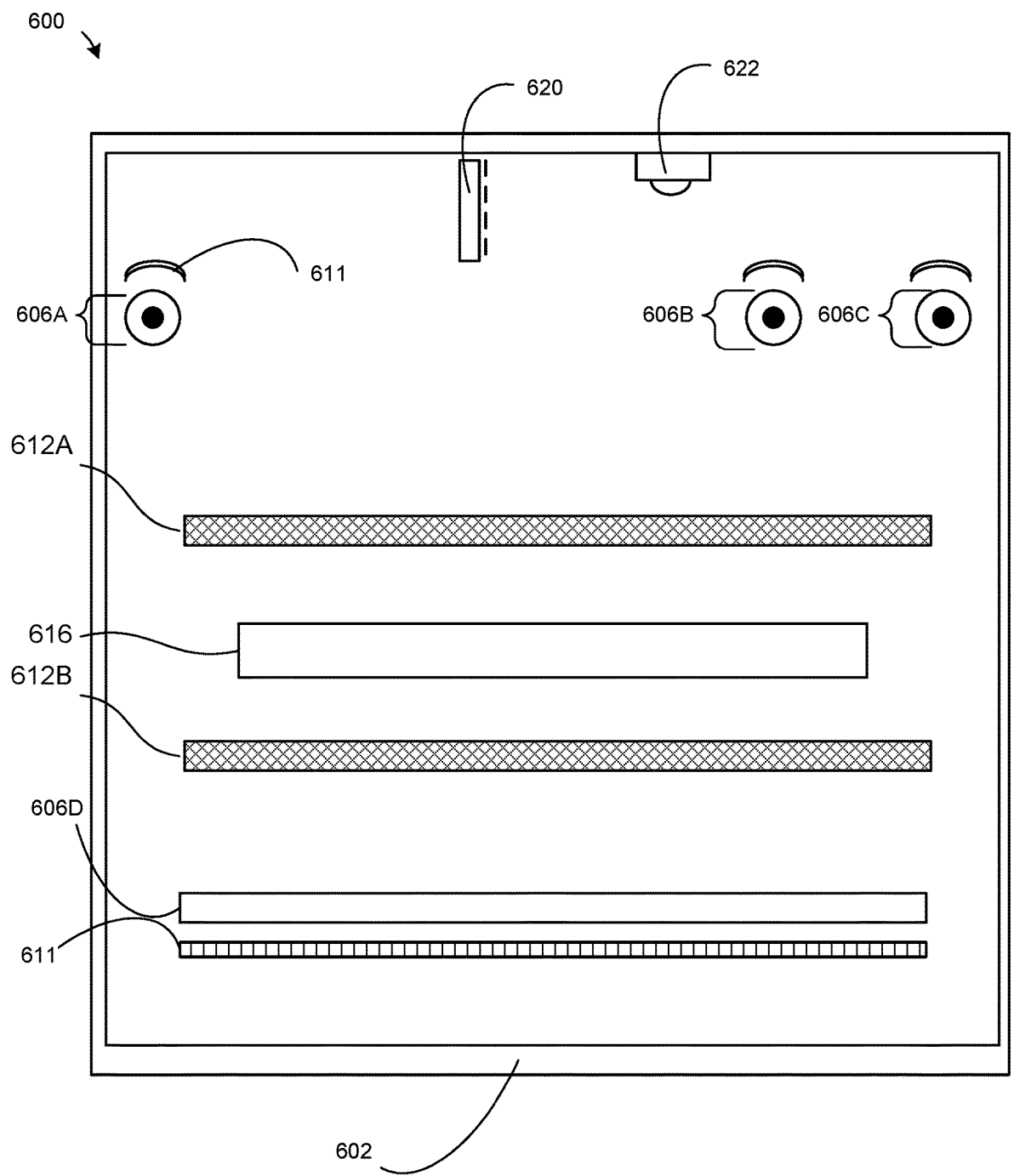
FIG. 6 is a cross-sectional front view of a second example of a cooking instrument, in accordance with various embodiments.

FIG. 6 is a cross-sectional front view of a second example of a cooking instrument 600, in accordance with various embodiments. This second example can illustrate various features in various embodiments of the disclosed cooking instrument. A particular feature, structure, or characteristic described in connection with the second example can be included in the first example. All of the described examples have features that are not mutually exclusive from other examples.

For example, the cooking instrument 600 includes heating elements, and therefore filament assemblies (e.g., a filament assembly 606A, a filament assembly 606B, a filament assembly 606C, and a filament assembly 606D, collectively as the "filament assemblies 606"). The filament assemblies 606 can differ from the filament assemblies 506 in that an upper set (e.g., the filament assemblies 606A, 606B, and 606B) extends longitudinally at a substantially perpendicular angle from a lower set (e.g., the filament assembly 606D and other filament assemblies not shown). Further unlike the filament assemblies 506, the filament assemblies 606 are not uniformly spaced apart from each other.

A reflector 611 can be positioned to be spaced apart from each of the filament assemblies 606. The reflector 611 can be a standalone structure unlike the coating of the reflector 511. The reflector 611 can be spaced within a distance from a filament assembly (e.g., therefore a heating element) to have anti-fouling characteristics and to vaporize any food debris. The cooking instrument 600 can include a fan 620. Unlike the cooling system 520, the fan 620 is not specifically directed to any of the filament assemblies 606.

A chamber 602 is substantially similar to the chamber 502. Perforated metal sheets 612A and 612B are substantially similar to the perforated metal sheets 512. A tray 616 is substantially similar to the tray 516, but does not include a reflective portion. The camera 622 is substantially similar to the camera 522.

Figure 7:
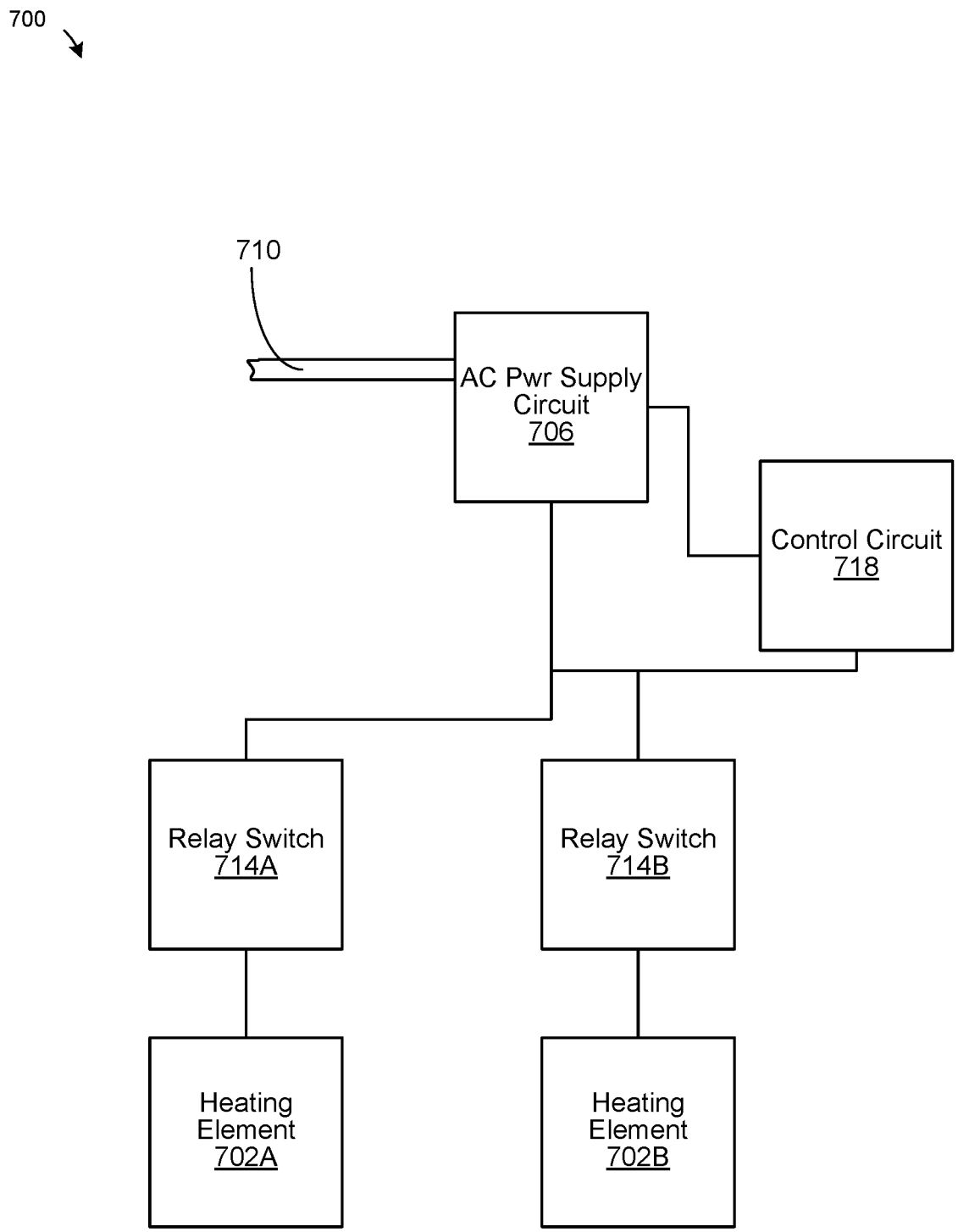
FIG. 7 is a circuit diagram of a heating system of a cooking instrument, in accordance with various embodiments.

FIG. 7 is a circuit diagram of a heating system 700 of a cooking instrument (e.g., the cooking instrument 100, the cooking instrument 200, and/or the cooking instrument 300), in accordance with various embodiments. The heating system 700 can include a plurality of heating elements (e.g., a heating element 702A, a heating element 702B, etc., collectively the "heating elements 702") configured to generate electromagnetic waves. Each heating element is configurable to operate over a range of peak wavelengths.

An alternating current (AC) power supply circuit 706 is configured to convert AC power from an AC power line 710 to direct current (DC) power. The AC power line 710 provides up to a maximum power threshold before triggering a circuit breaker. The AC power supply circuit 706 can include a power factor correction (PFC) circuit. The AC power supply circuit 706 can divide an AC power cycle from the AC power line into two half waves.

A plurality of relay switches (e.g., a relay switch 714A, a relay switch 714B, etc., collectively as the "relay switches 714") can respectively correspond to the plurality of heating elements 702. The relay switches 714 can be TRIAC switches. The DC power from the AC power supply circuit 706 is routed to a heating element when a corresponding relay switch is switched on. A control circuit 718 is configured to switch on a subset of the plurality of relay switches 714 such that a total power drawn through the relay switches is equal to or below the maximum power threshold. The control circuit 718 can be configured to switch on a single relay switch at a time to concentrate the DC power provided via the AC power supply at the maximum power threshold to a single heating element. The control circuit 718 can include a processor (e.g., the computing device 206). The relay switches 714 can be configured by the control circuit 718 to provide one half wave to a first heating element and another half wave to a second heating element.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Some embodiments of the disclosure have other aspects, elements, features, and steps in addition to or in place of what is described above. These potential additions and replacements are described throughout the rest of the specification.

The invention claimed is:

1. A cooking instrument comprising:
a cooking chamber;
a support tray adapted to hold food in the cooking chamber and having a first absorption band;
a heating system comprised of:
 a heating element, the heating element configurable to emit waves at different peak emission wavelengths; and
 an envelope for the heating element, the envelope having a second absorption band different from the first absorption band; and
a control system configured to:
 identify a food profile associated with the food on the support tray;
 receive an instruction to cook the food in the cooking chamber according to a digital recipe; and
 vary, according to the digital recipe and the identified food profile, a peak wavelength to be emitted by the heating element to specifically and directly transfer energy to the support tray, the envelope of the heating element, a specific type of edible material in the food, or any combination thereof.

2. The cooking instrument of claim 1, wherein the cooking chamber includes a door; and the cooking chamber is capable of being entirely enclosed without any visibly transparent parts when the door is closed.

3. The cooking instrument of claim 1, further comprising a reflector on the heating element to reflect emission of the heating element.

4. The cooking instrument of claim 3, wherein the reflector is adapted to be spaced apart from the heating element at a distance such that, together the heating element and the reflector have anti-fouling characteristics and are capable of breaking apart or preventing excess accumulation of food debris in the space therebetween.

5. The cooking instrument of claim 1, wherein the heating system is configurable by the control system to emit waves that disproportionally heats the envelope over the support tray and the food.

6. A cooking instrument comprising:
a cooking chamber;
a support tray adapted to hold food in the cooking chamber;
a heating system comprised of a heating element configurable to emit waves at different emission spectral distributions including:
 at a first emission spectral distribution such that the emitted waves disproportionally transfer energy directly to the support tray compared to directly to the food, and
 at a second emission spectral distribution such that the emitted waves disproportionally transfer energy directly to the food compared to directly to the support tray; and
a control system configured to select one of the different emission spectral distributions and drive the heating element to emit at the selected one of the different emission spectral distributions.

7. The cooking instrument of claim 6, wherein the support tray has an optically transparent region enabling visible light to substantially travel through two opposing surfaces of the support tray.

8. The cooking instrument of claim 7, wherein the support tray includes a reflective portion.

9. A cooking instrument, comprising:
a cooking chamber;
a support tray adapted to hold food in the cooking chamber;
a control system; and
a heating system comprised of a first heating element and a second heating element, wherein the first heating element and the second heating element are each configurable to emit waves according to one of multiple spectral configurations selectable by the control system, wherein the multiple spectral configurations correspond respectively to whether one or more particular materials within the cooking chamber are substantially transparent or substantially opaque to the emitted waves, the particular materials including the support tray, and wherein the control system is configured to drive the heating system to sequentially power the first heating element then the second heating element or to drive the heating system to power both the first heating element and the second heating element.

10. The cooking instrument of claim 9, wherein, under a first spectral configuration corresponding to a shorter peak wavelength compared to a second spectral configuration, the control system is configured to control the heating system to power the first heating element utilizing maximum power of the heating system.

11. The cooking instrument of claim 9, wherein the heating system includes a plurality of heating elements with at least a first set of one or more heating elements disposed directly above the support tray and a second set of one or more heating elements disposed directly below the support tray.

12. The cooking instrument of claim 11, wherein each heating element of the first set are non-uniformly spaced apart.

13. The cooking instrument of claim 9, wherein the support tray is composed of one or more materials; and wherein a peak wavelength of waves emitted by the heating system at the particular configuration is outside of the one or more absorption bands of the one or more materials.

14. The cooking instrument of claim 9, wherein the heating system is capable of emitting waves according to an emission spectrum specified by the particular configuration; and wherein a portion of the emission spectrum is outside of an absorption band of the one or more materials.

15. A cooking instrument, comprising:
a cooking chamber;
a support tray adapted to hold food in the cooking chamber;
a control system; and
a heating system comprised of at least a heating element;
wherein the control system is configured to control the heating system to generate first electromagnetic waves under a first spectral configuration targeting a first zone on the support tray and second electromagnetic waves under a second spectral configuration targeting a second zone on the support tray, wherein, under the first spectral configuration, the support tray is substantially transparent to the first electromagnetic waves and, under the second spectral configuration, the support tray is not substantially transparent to the second electromagnetic waves.

16. The cooking instrument of claim 15, wherein under the second spectral configuration, the support tray is substantially opaque to the second electromagnetic waves.

17. The cooking instrument of claim 15, wherein the heating system are configured by the control system to simultaneously generate the first electromagnetic waves targeting the first zone and the second electromagnetic waves targeting the second zone.

18. The cooking instrument of claim 15, wherein the heating system are configured by the control system to sequentially generate the first electromagnetic waves targeting the first zone then the second electromagnetic waves targeting the second zone.

19. The cooking instrument of claim 16, wherein the heating system includes multiple heating elements and wherein the heating system are configured to generate the first electromagnetic waves by utilizing maximum power of the heating system on an individual heating element.

20. The cooking instrument of claim 15, further comprising a material that substantially prevent transmission of at least a portion of the first or second electromagnetic waves through such material to a portion of the support tray.

* * * * *